United States Patent
Lee

(10) Patent No.: US 6,669,512 B2
(45) Date of Patent: Dec. 30, 2003

(54) SORTING DEVICE OF ELECTRONIC CARD CONNECTOR SOCKET

(75) Inventor: Ipson Lee, Taoyuan (CN)

(73) Assignee: Super Link Electronic Co., Ltd., Taoyuan (TW)

( * ) Notice: Subject to any disclaimer, the term of this patent is extended or adjusted under 35 U.S.C. 154(b) by 201 days.

(21) Appl. No.: 10/032,005

(22) Filed: Dec. 31, 2001

(65) Prior Publication Data

US 2003/0121831 A1 Jul. 3, 2003

(51) Int. Cl.[7] ............................................... H01R 24/00
(52) U.S. Cl. ........................ 439/630; 439/680; 439/677
(58) Field of Search ................................ 439/630, 680, 439/681, 674, 677

(56) References Cited

U.S. PATENT DOCUMENTS

| | | | | |
|---|---|---|---|---|
| 3,823,367 A | * | 7/1974 | Kaye et al. | 439/680 |
| 4,780,603 A | * | 10/1988 | Hamada | 439/677 |
| 4,864,116 A | * | 9/1989 | Banjo et al. | 439/680 |
| 5,036,430 A | * | 7/1991 | Hills | 439/677 |
| 6,478,630 B1 | * | 11/2002 | Hsu | 439/680 |
| 6,511,350 B1 | * | 1/2003 | Ito et al. | 439/677 |
| 6,527,568 B2 | * | 3/2003 | Nakamura | 439/680 |

FOREIGN PATENT DOCUMENTS

| | | | | |
|---|---|---|---|---|
| JP | 1-166475 | * | 6/1989 | 439/680 |

\* cited by examiner

*Primary Examiner*—Tho D. Ta
(74) *Attorney, Agent, or Firm*—Rosenberg, Klein & Lee

(57) ABSTRACT

A sorting device of electronic card connector socket, which is mounted in the wider socket or the slot of the socket. A gate board is resiliently pivotally mounted in the wider socket for blocking the passage of the socket. Each sorting member is resiliently pivotally mounted in the proximity of the gate board and extends into the socket for locking and preventing the gate board from being pushed away. A gap defined between the two sorting members is larger than the thickness of an incorrect card to be hindered. The thinner incorrect card is unable to at the same time push away both the sorting members and will be hindered by the gate board from being inserted into the wider socket. Reversely, the thicker correct card is able to simultaneously push away both sorting members to unlock the gate board and be successfully inserted into the socket.

6 Claims, 6 Drawing Sheets

SORTING DEVICE OF ELECTRONIC CARD CONNECTOR SOCKET

BACKGROUND OF THE INVENTION

1. Field of the Invention

The present invention is related to a sorting device of electronic card connector socket, which is able to sort the cards inserted into the socket of the electronic card connector. An incorrect card with thinner thickness is hindered from being inserted into the electronic card connector. Therefore, the terminal therein is protected from being damaged.

2. Description of the Prior Art

The existent notebook-type computer is equipped with an electronic card connector for externally connecting with a personal computer memory card. In order to ensure security, in addition to a socket for inserting the personal computer memory card, the electronic card connector further has a socket for inserting an identification card. A user must insert a correct identification card for normal use. The personal computer memory card has an area close to that of the identification card, while the thickness of the personal computer memory card is different from that of the identification card. Accordingly, the sockets for the personal computer memory card and identification card are quite similar to each other. As a result, a user often misinserts the thinner identification card into the socket for the personal computer memory card. This will make that the terminal on rear side of the electronic card connector forcedly bent and deformed by the identification card.

SUMMARY OF THE INVENTION

It is therefore a primary object of the present invention to provide a sorting device of electronic card connector socket, including: a gate board pushed by a spring and resiliently pivotally mounted in the electronic card connector, the gate board having a hindering board projecting from a first side of a pivot hole of the gate board, the hindering board in normal state extending into the socket of the electronic card connector to block the passage of the socket; and at least two sorting members each of which is pushed by a spring and pivotally mounted in the electronic card connector between the gate board and the slot of the socket. Each sorting member having a projecting board projecting from a first side of a pivoting section of the sorting member. The projecting board in normal state extends into the socket. The projecting boards projectively arranged in socket of the electronic card connector from upper side to lower side. A gap defined between the projecting boards is larger than the thickness of an incorrect card to be hindered. A stop member projects from a second side of the pivoting section of the sorting member. In normal state, the stop member abuts against the gate board to prevent the gate board from freely deflecting about the pivot shaft thereof. Only when a user inserts a correct card into the socket, the correct card can simultaneously push away both sorting members to unlock the gate board. At this time, the correct can push and bias the gate board and be successfully inserted into the socket. Reversely, a thinner incorrect card is unable to at the same time push away both the sorting members and thus will be hindered by the gate board from being inserted into the socket.

The present invention can be best understood through the following description and accompanying drawings wherein:

DETAILED DESCRIPTION OF THE PREFERRED EMBODIMENTS

Figure 1:
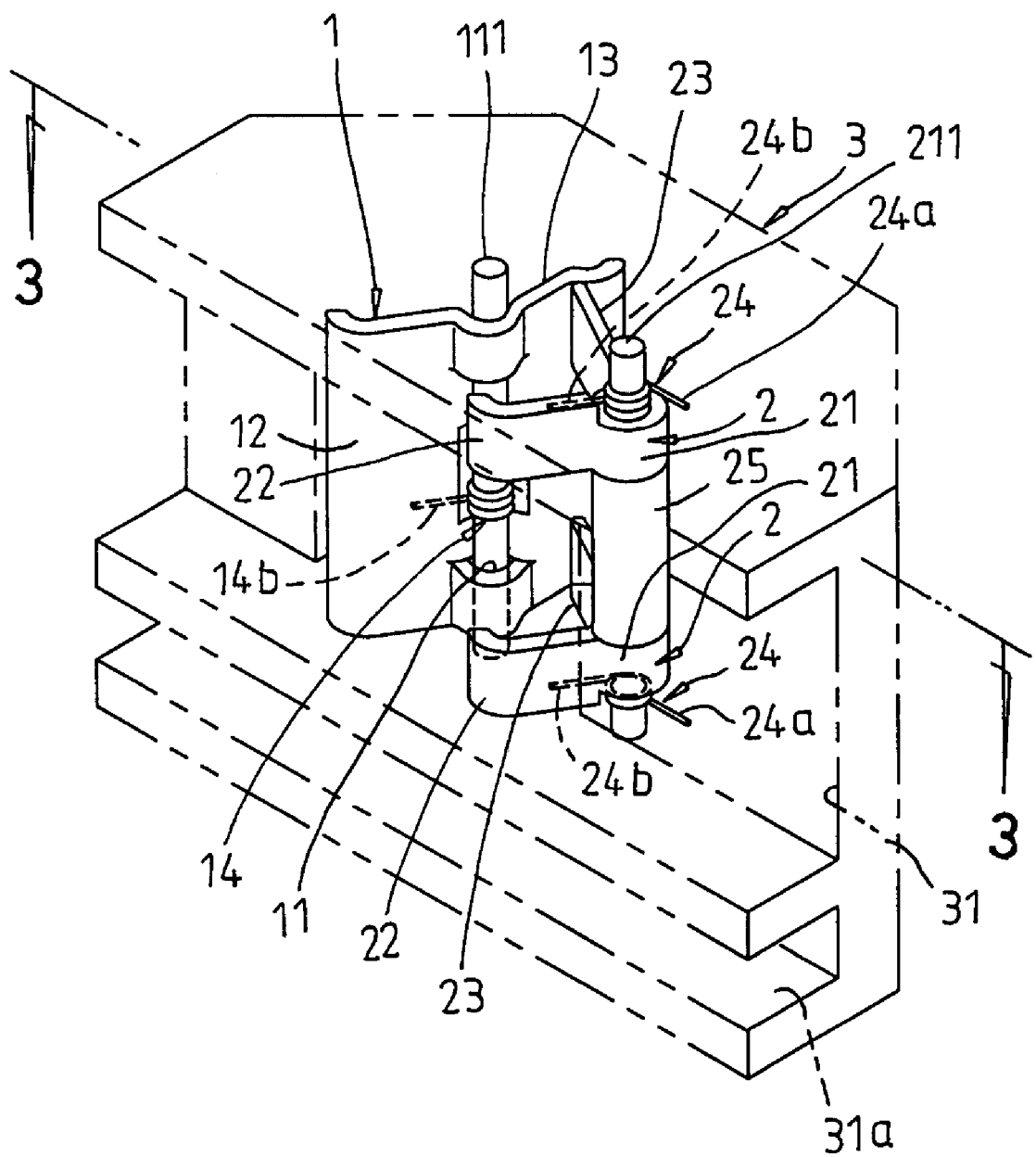
FIG. 1 is a perspective view of the present invention.

Please refer to FIGS. 1 to 6. The sorting device of electronic card connector socket of the present invention includes a gate board 1 and at least two sorting members 2. The gate board 1 is pivotally connected with one side of the socket 31 of the electronic card connector 3. The gate board 1 has a hindering board 12 projecting into the socket 31. The sorting members 2 are pivotally mounted in the socket 31 of the electronic card connector 3 between the gate board 1 and the slot 310 of the socket 31. In normal state, the sorting member 2 abuts against the gate board 1 and prevents the gate board 1 from freely deflecting. When a user inserts a card C1 with correct thickness into the socket 31, the respective sorting members 2 can be simultaneously pushed away from the gate board 1. At this time, the gate board 1 can be pushed and biased by the correct card C1 and thus the correct card C1 can be successfully inserted into the electronic card connector 3 to connect with a terminal section 32 on rear side thereof. Reversely, an incorrect card will be obstructed by the gate board 1 and prevented from being successfully inserted into the electronic card connector 3.

Figure 2:
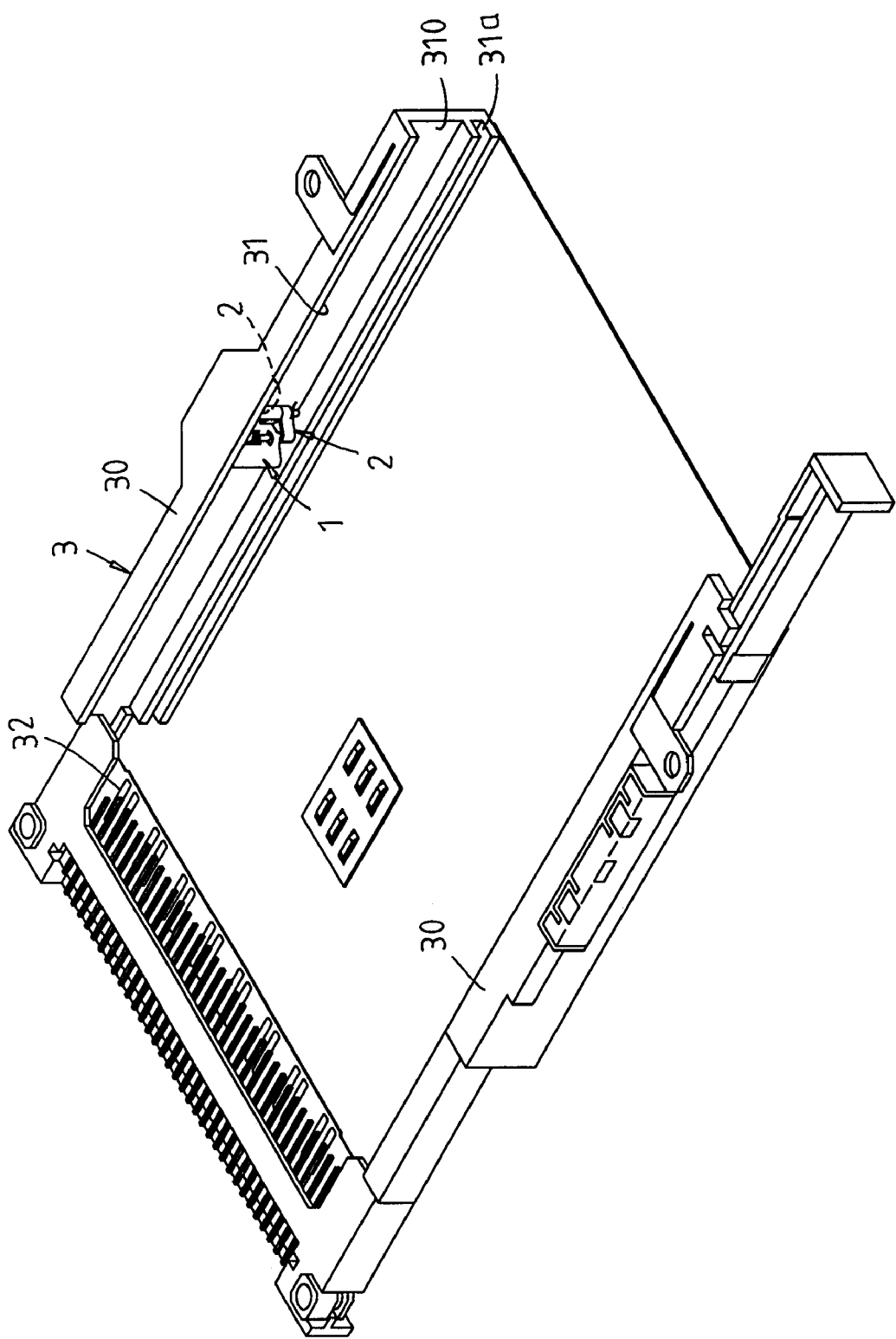
FIG. 2 is a perspective view showing that the present invention is mounted in an electronic card connector.

The present invention is applicable to the electronic card connector 3 as shown in FIG. 2. The electronic card connector 3 includes two lateral arms 30 defining therebetween an upper and a lower sockets 31, 31a in parallel to each other. The rear side of the upper socket 31 is provided with a terminal section 32 for connecting with an inserted personal computer memory card. The lower socket 31a is for an identification card to insert therein. The electronic card connector 3 pertains to prior art and will not be further described herein. The present invention is also applicable to any other conventional electronic card connectors.

Figure 3:
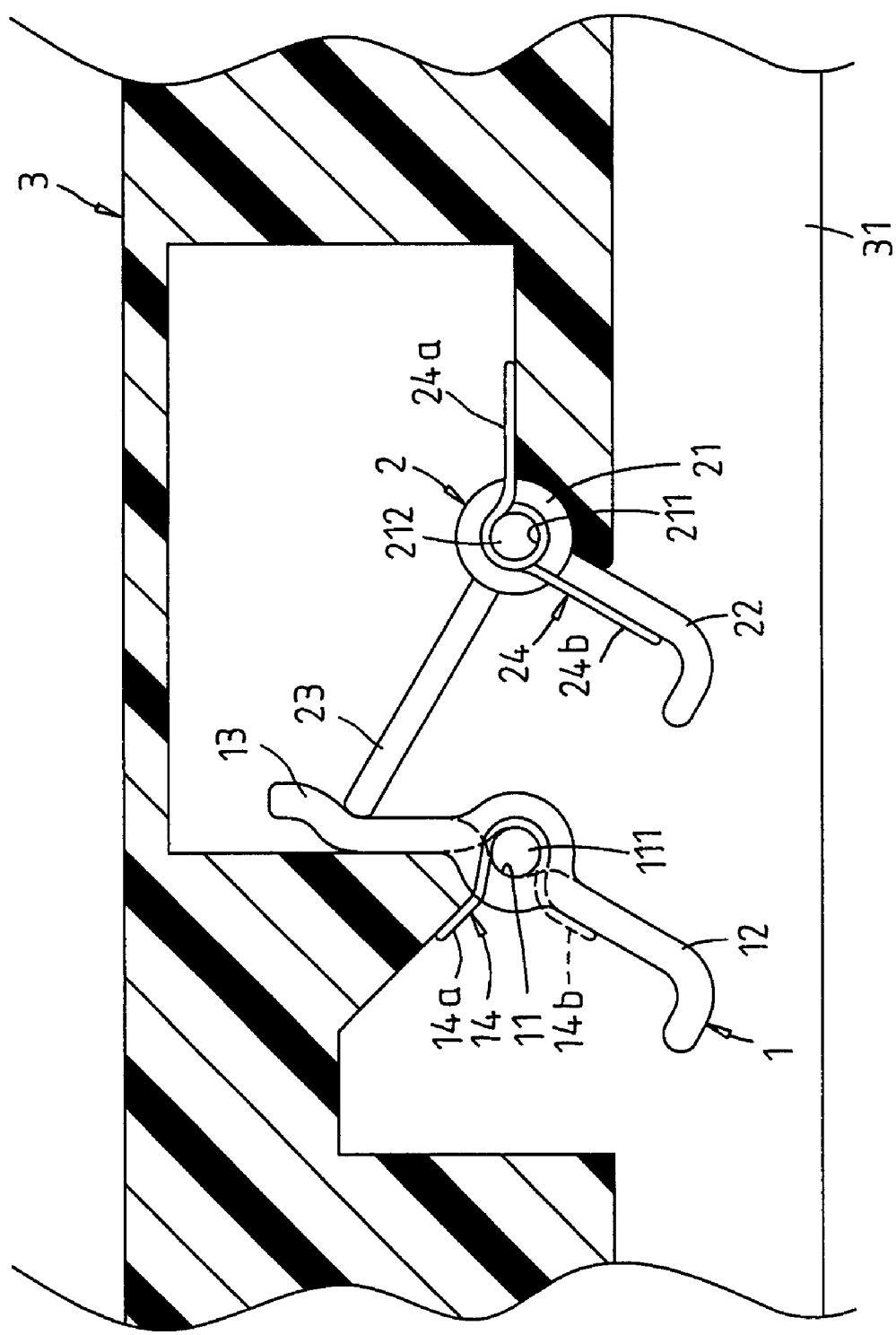
FIG. 3 is a partially sectional view taken along line 3—3 of FIG. 1.

Referring to FIGS. 1 and 3, the gate board 1 includes: a pivot hole 11 formed at the middle of the gate board 1, a pivot shaft 111 being fitted in the pivot hole 11 to pivotally mount the gate board 1 in the electronic card connector 3; a hindering board 12 which projects from a first side of the pivot hole 11 and in normal state extends into the socket 31 of the electronic card connector 3; a locating board 13 projecting from a second side of the pivot hole 11; and a spring 14 fitted on the pivot shaft 111. Two ends 14a, 14b of the spring 14 in normal state respectively abut against the electronic card connector 3 and the gate board 1 so as to push the hindering board 12 of the gate board 1 to extend into the socket 31 of the electronic card connector 3.

The upper and lower edges of the hindering board 12 are proximate to the upper and lower walls of the socket 31 so as to stop a thinner card from passing through the gap between the hindering board 12 and the upper and lower walls of the socket 31.

Referring to FIGS. 1 and 3, the sorting member 2 includes: a pivoting section 21 formed with a shaft hole 211 in which a pivot shaft 212 is fitted to pivotally mount the sorting member 2 in the electronic card connector 3; a projecting board 22 which integrally projects from a first side of the pivoting section 21; a stop member 23 projecting from a second side of the pivoting section 21 toward the gate board 1; and a spring 24. Two ends of the spring 24 respectively abut against the electronic card connector 3 and the sorting member 2. In normal state, the spring 24 makes the projecting board 22 deflectively positioned in the socket 31 and makes the free end of the stop member 23 lean against the locating board 13 of the second side of the gate board 1.

Figure 6:
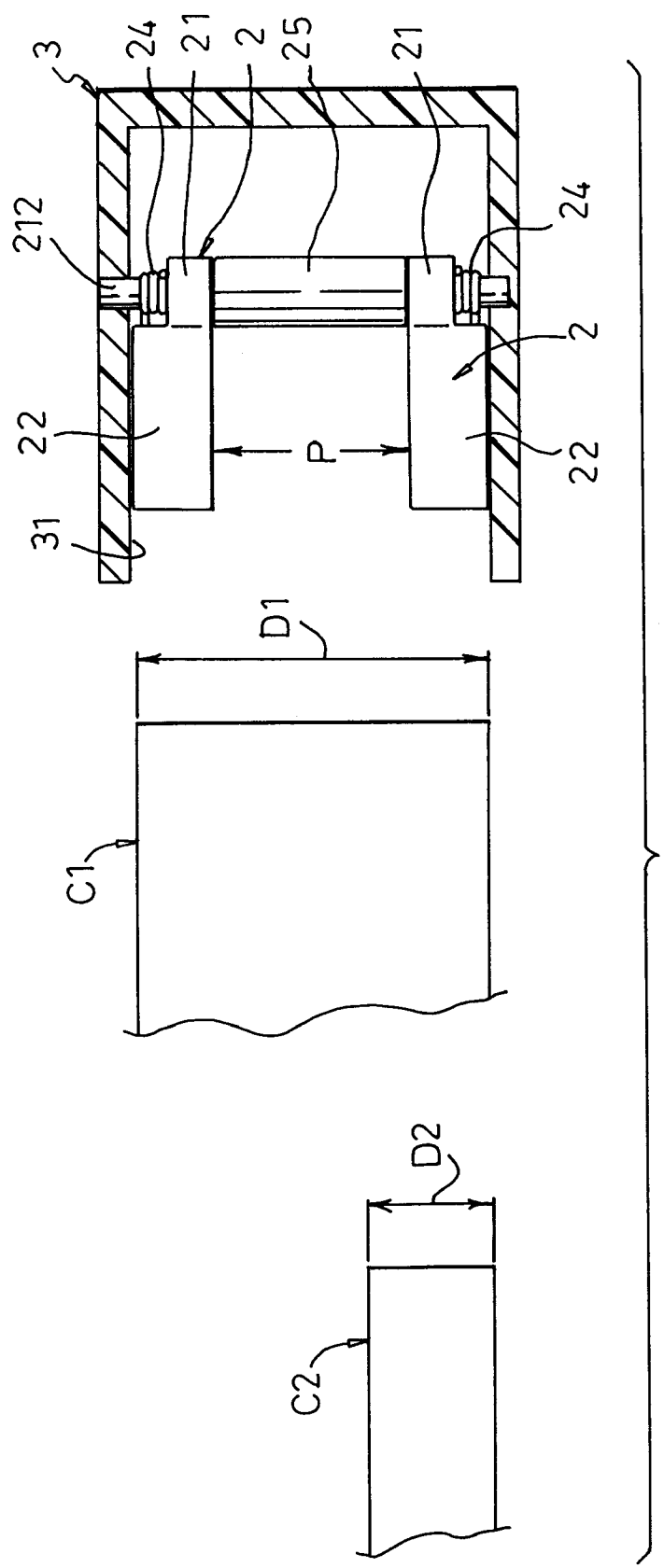
FIG. 6 shows the relationship between the sorting members of the present invention and the cards to be sorted.

The sorting members 2 are serially pivotally fitted on the same pivot shaft 212. A sleeve 25 is fitted between two adjacent sorting members 2 to define the distance between the sorting members 2. As shown in FIGS. 1 and 6, the respective sorting members 2 are pivotally projectively arranged in the electronic card connector 3 from upper side to lower side. The gap P between the projecting boards 22 of the uppermost and lowermost sorting members 2 is smaller than the thickness D1 of the correct card C1 to be inserted into the socket 31, while being larger than the thickness D2 of an incorrect card C2 (such as an identification card) to be hindered.

Figure 4:
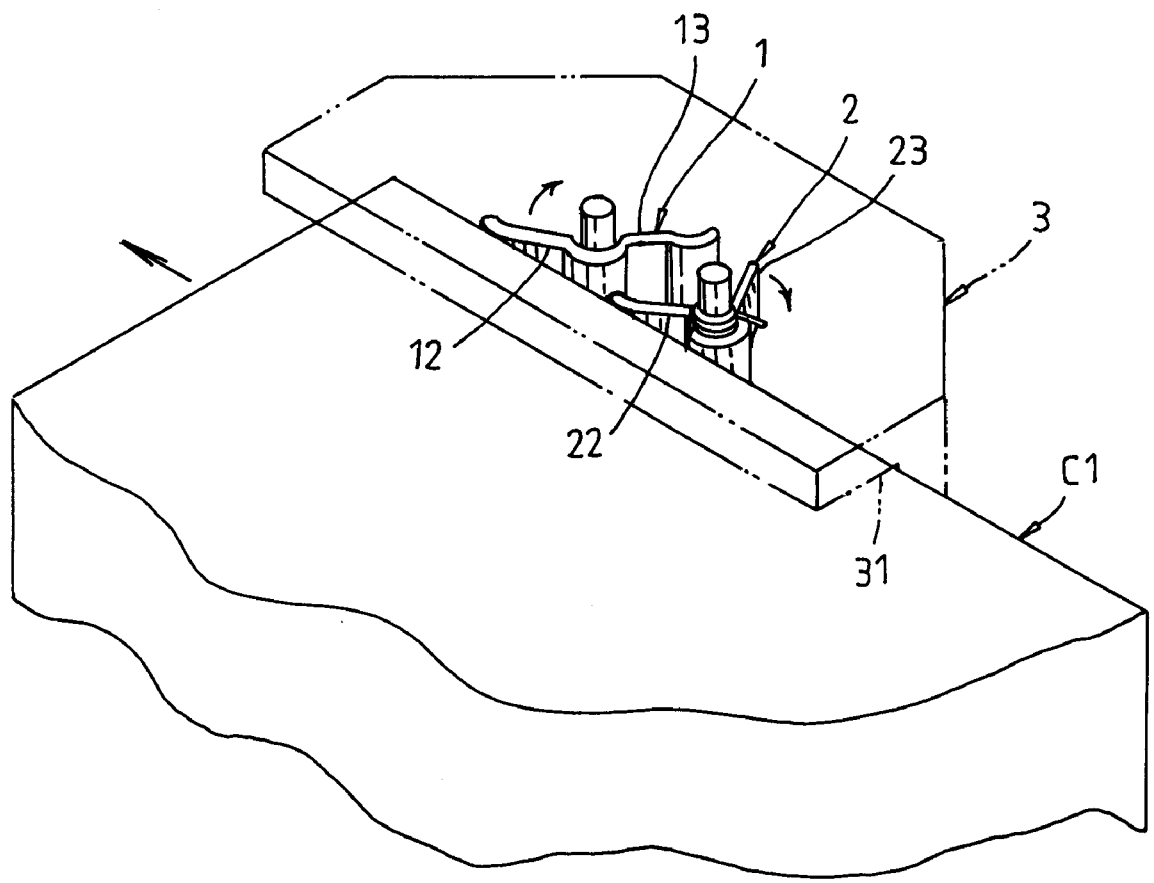
FIG. 4 shows that a correct card is inserted into the socket.

Referring to FIG. 4, when a user inserts a correct card C1 into the corresponding socket 31, the thickness of the correct card C1 is larger than the gap P between the projecting boards 22 of the uppermost and lowermost sorting members 2 so that the correct card C1 will successfully push the projecting boards 22 and make the sorting members 2 pivot about the shafts of the pivoting sections 21. Under such circumstance, the stop members 23 of the sorting members 2 no more abut against the locating board 13 of the gate board 1 and the correct card C1 can push and bias the hindering board 12 of the gate board 1 to successfully get into the bottom of the socket 31 of the electronic card connector 3 and electrically connect with the terminal section 32 thereof.

Figure 5:
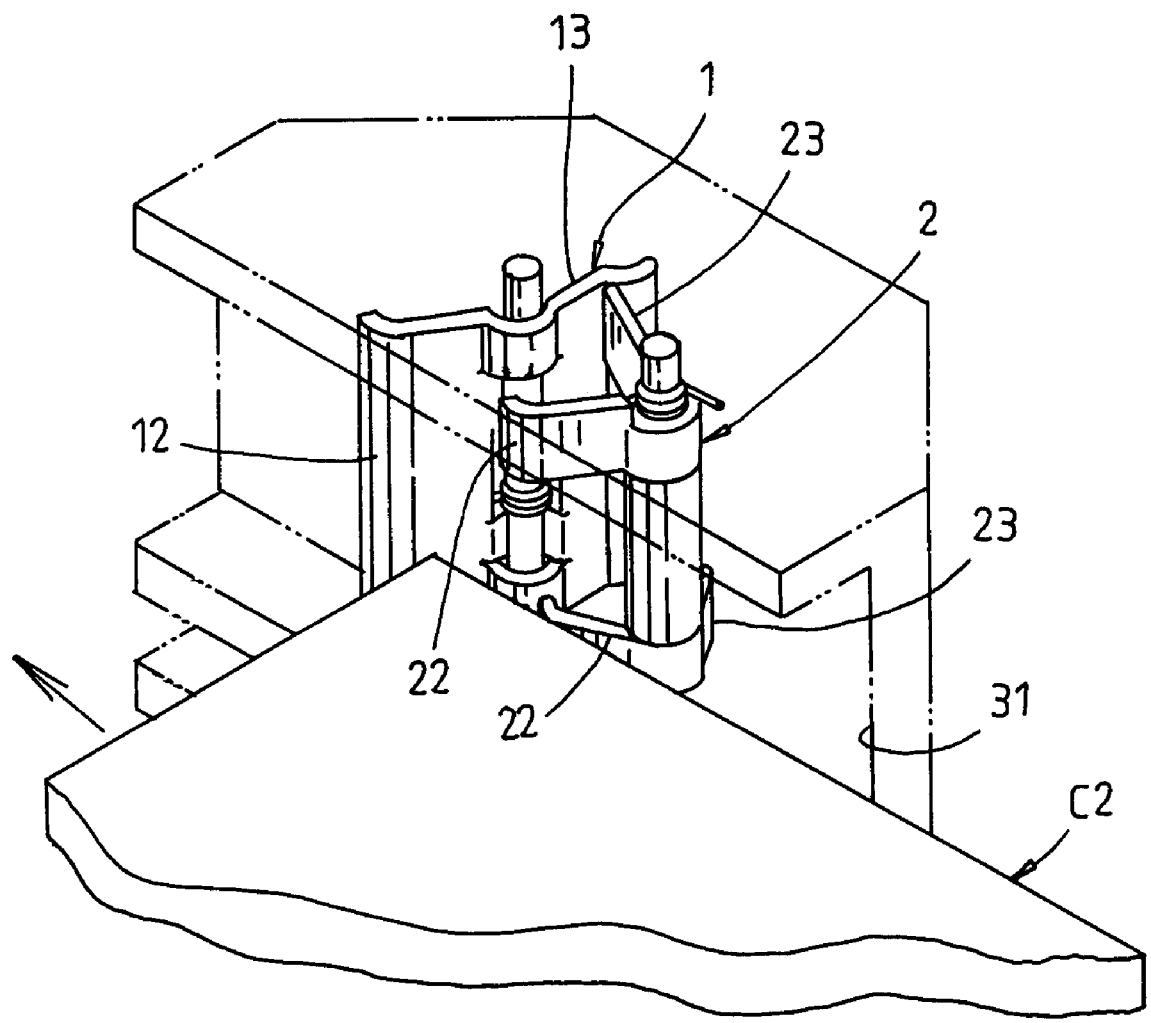
FIG. 5 shows that an incorrect card is inserted into the socket.

Referring to FIG. 5, in case a user inserts an incorrect thinner card C2 (such as an identification card) into the socket 31 equipped with the sorting device, since the thickness of the thinner card C2 is smaller than the gap P between the projecting boards 22 of the uppermost and lowermost sorting members 2, the thinner card C2 is unable to push all the projecting boards 22 of the sorting members 2. That is, the stop member 23 of at least one sorting member 2 still abuts against the locating board 13 of the gate board 1. Therefore, when the incorrect card C2 is further inserted to the hindering board 12 of the gate board 1 which is stopped by at least one sorting member 2 from deflecting, the incorrect thinner board C2 is hindered by the hindering board 12 of the gate board 1 from being further inserted into the electronic card connector. Accordingly, the terminal section 32 on rear side of the electronic card connector is protected from being bent and damaged by the incorrect thinner card C2.

According to the above arrangement, the sorting device of the present invention is able to effectively prevent an incorrect thinner card (such as an identification card) from being incautiously inserted into the personal computer memory card socket of the electronic card connector. Therefore, the terminal section on rear side of the electronic card connector is protected from being bent and damaged by the incorrect thinner card.

The sorting device of the present invention can be mounted on single side of the socket or the slot of the socket or mounted on both sides thereof.

The above embodiments are only used to illustrate the present invention, not intended to limit the scope thereof. Many modifications of the above embodiments can be made without departing from the spirit of the present invention.

What is claimed is:

1. A sorting device of electronic card connector socket, comprising:

(a) a gate board pushed by a spring and resiliently pivotally mounted in the electronic card connector, the gate board having a hindering board projecting from a first side of a pivot hole of the gate board, the hindering board in normal state extending into the socket of the electronic card connector to block the passage of the socket; and (b) at least two sorting members each of which is pushed by a spring and pivotally mounted in the electronic card connector between the gate board and the slot of the socket, each sorting member having a projecting board projecting from a first side of a pivoting section of the sorting member, the projecting board in normal state extending into the socket, a gap being defined between the projecting boards of the uppermost and lowermost sorting members, a stop member projecting from a second side of the pivoting section of the sorting member, in normal state, the stop member abutting against the gate board to prevent the gate board from freely deflecting about the pivot shaft thereof.

2. The sorting device of electronic card connector socket as claimed in claim 1, wherein each sorting member includes: a pivoting section formed with a shaft hole in which a pivot shaft is fitted to pivotally mount the sorting member in the electronic card connector; a projecting board which integrally projects from a first side of the pivoting section; a stop member projecting from a second side of the pivoting section toward the gate board; and a spring, two ends of the spring respectively abutting against the electronic card connector and the sorting member, in normal state, the spring making the projecting board deflectively positioned in the socket of the electronic card connector and making a free end of the stop member lean against the locating board of the second side of the gate board.

3. The sorting device of electronic card connector socket as claimed in claim 1, wherein the sorting members are serially pivotally fitted on the same pivot shaft, a sleeve being fitted between two adjacent sorting members to define the distance between the sorting members.

4. The sorting device of electronic card connector socket as claimed in claim 1, wherein the respective sorting members are pivotally projectively arranged in the electronic card connector from upper side to lower side, the gap between the projecting boards of the uppermost and lowermost sorting members being smaller than the thickness of the correct card to be inserted into the socket, while being larger than the thickness of an incorrect card to be hindered.

5. The sorting device of electronic card connector socket as claimed in claim 1, wherein the gate board includes: a pivot hole formed at the middle of the gate board, a pivot shaft being fitted in the pivot hole to pivotally mount the gate board in the electronic card connector; a hindering board which projects from a first side of the pivot hole and in normal state extends into the socket of the electronic card connector; a locating board projecting from a second side of the pivot hole; and a spring fitted on the pivot shaft, two ends of the spring in normal state respectively abutting against the electronic card connector and the gate board so as to push the hindering board of the gate board to extend into the socket of the electronic card connector.

6. The sorting device of electronic card connector socket as claimed in claim 5, wherein an upper and a lower edges of the hindering board of the gate board are proximate to upper and lower walls of the socket.

* * * * *